(12) United States Patent
Jiang (10) Patent No.: US 11,669,527 B1
(45) Date of Patent: Jun. 6, 2023

(54) OPTIMIZED POLICY DATA STRUCTURE FOR DISTRIBUTED AUTHORIZATION SYSTEMS

(71) Applicant: SAP SE, Walldorf (DE)

(72) Inventor: Yuan Jiang, Germantown, MD (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/533,937

(22) Filed: Nov. 23, 2021

(51) Int. Cl.
*G06F 16/00* (2019.01)
*G06F 16/2455* (2019.01)
*G06F 16/25* (2019.01)
*G06F 16/22* (2019.01)

(52) U.S. Cl.
CPC .... *G06F 16/24564* (2019.01); *G06F 16/2246* (2019.01); *G06F 16/258* (2019.01)

(58) Field of Classification Search
None
See application file for complete search history.

(56) References Cited

U.S. PATENT DOCUMENTS

| | | | | |
|---|---|---|---|---|
| 6,941,472 | B2* | 9/2005 | Moriconi | H04L 63/102 |
| | | | | 707/999.009 |
| 7,350,226 | B2* | 3/2008 | Moriconi | H04L 63/102 |
| | | | | 726/1 |
| 11,122,089 | B2* | 9/2021 | Yuan | H04L 63/205 |
| 2001/0007133 | A1* | 7/2001 | Moriconi | H04L 63/1408 |
| | | | | 709/224 |
| 2018/0309629 | A1* | 10/2018 | Mohanram | H04L 41/0893 |
| 2018/0367397 | A1* | 12/2018 | Harneja | H04L 41/0869 |
| 2019/0190959 | A1* | 6/2019 | Yuan | G06F 21/604 |
| 2020/0004742 | A1* | 1/2020 | Nagarajan | G06F 16/248 |
| 2021/0334270 | A1* | 10/2021 | Li | G06F 16/9535 |
| 2022/0284020 | A1* | 9/2022 | Wang | G06F 16/2471 |

OTHER PUBLICATIONS

Using Expert Systems to Statically Detect "Dynamic" Conflicts in XACML, Stephen et al., (Year: 2016).*

\* cited by examiner

*Primary Examiner* — Jean M Corrielus
(74) *Attorney, Agent, or Firm* — Fountainhead Law Group P.C.

(57) ABSTRACT

Methods and systems are disclosed for processing policies. A query policy tree with expressions and combination rules is received. A second policy tree stored in a policy repository is searched to select a sub-policy in a neutral format, reflecting a structure with a combination rule and a leaf with a condition expression. A depth of the structure is reduced through removal of redundant combination rules and combinable leaf expressions. The sub-policy tree is selected from the second stored policy tree by comparing the query policy tree. The selected sub-policy tree is copied to a third policy tree. Leaves of the third policy tree are evaluated against the leaves of the query policy. The nodes of the third policy are joined against the node of the query policy. The third policy is reduced to the neutral format by combining evaluated leaves and removing redundant combination rules. Finally, a response is provided.

20 Claims, 7 Drawing Sheets

OPTIMIZED POLICY DATA STRUCTURE FOR DISTRIBUTED AUTHORIZATION SYSTEMS

FIELD

Embodiments of the present teachings relate to a platform neutral policy authorization. More specifically, embodiments of the present teachings relate to a policy tree structure having a reduced tree structure to express policy information, reducing redundant combination of operations by combining policies. Accordingly, a reduced policy tree may be at its minimum depth without losing the meaning or functionality of the policy.

RELATED ART

With cloud resources and services, and particularly cloud microservices, software (permissions) authorization systems are no longer monolithic and limited to one particular resource or service. For example, one authorization policy may be defined by multiple parties, including software designers, software integrators, and company administrators, all comprising varying levels of credentials and allowed access. Furthermore, in addition to multiple parties accessing and changing the authorization policy, an authorization policy may be present on multiple resources or services. For example, an authorization policy may be defined in a first cloud software but used in another, distinct cloud software. Furthermore, an authorization policy may be partially used or evaluated in a first cloud software prior to being fully used or evaluated in another, distinct cloud software. Because authorization policies may be used over several cloud software services, there is an inherent challenge in expressing the authorization policies from one cloud software to another as the authorization policies are limited by their underneath data structure. Prior to transferring an authorization policy from a first cloud software to another cloud platform the authorization policy must be translated from the structure of the first cloud software to the structure of the second cloud software. Such translation can be time consuming and over subsequent translations, there is a risk of mis-translations.

Furthermore, authorization policies associated with a particular cloud platform are written and formatted to work with the specific use cases of that particular platform. For example, an authorization policy for a Microsoft Azure use case is written for running specifically on the Microsoft Azure platform without regard or consideration of other platforms, such as Google Cloud Platform or Amazon Web Services. Accordingly, platform specific policies present inherent challenges and inefficiencies when data must be transferred from one platform or resource to another platform or resource. Specifically, authorization policies must be translated from the first platform's format and language to the second platform's format and language. Repeated translations cost both time and energy while also introducing increased opportunities for improper translations.

Accordingly, what is needed is a platform neutral system of creating policy authorizations that may be used to configure authorizations for a plurality of cloud software. Furthermore, what is also needed is a policy authorization system that is efficient in establishing the permissions for the plurality of cloud software.

SUMMARY

Embodiments are directed to media, methods, and systems for processing policies comprising: receiving a query policy tree comprising a set of expressions and combination rules, responsive to receiving the query policy tree, searching a second policy tree stored in a policy repository to select a sub-policy, wherein the policies are organized in a neutral format, wherein the neutral format is a reduced tree data structure comprising at least one node having at least one combination rule and at least one leaf having at least one condition expression, wherein a depth of the reduced tree data structure is reduced through a removal of any redundant combination rules and combining evaluated leaf expressions, selecting the sub-policy tree from the second stored policy tree based upon comparing against the query policy tree, copying the selected sub-policy tree to a third policy tree, evaluating leaves of the third policy tree against the leaves of the query policy, joining the combination rule nodes of the third policy against the combination rule node of the query policy, reducing the third policy to the neutral format by combining evaluated leaves and removing redundant combination rules, and responding with the third policy tree.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments of the present teachings are described in detail below with reference to the attached drawing figures, wherein.

The drawing figures do not limit the present teachings to the specific embodiments disclosed and described herein. The drawings are not necessarily to scale, emphasis instead being placed upon clearly illustrating the principles of the present teachings.

DETAILED DESCRIPTION

The subject matter of the present teachings is described in detail below to meet statutory requirements; however, the description itself is not intended to limit the scope of claims.

Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present teachings. Terms should not be interpreted as implying any particular ordering of various steps described unless the order of individual steps is explicitly described.

The following detailed description references the accompanying drawings that illustrate specific embodiments in which the present teachings can be practiced. The embodiments are intended to describe aspects of the present teachings in sufficient detail to enable those skilled in the art to practice the present teachings. Other embodiments can be utilized, and changes can be made without departing from the scope of the claims. The following detailed description is, therefore, not to be taken in a limiting sense. The scope of the present claimed protection is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Broadly, embodiments of the present teachings provide for methods, systems, and computer-executable instructions that, when executed by a processor perform a method of receiving a policy from a first cloud resource written in a language and format that is native to the first cloud resource and translate the policy into a neutral format. For example, in the neutral format the policy may be expressed in a tree data structure. Furthermore, in addition to being formatted in a neutral format, the tree data structure may further be a reduced tree structure, having the minimum depth of branches and leaves so as to format the reduced tree structure to a minimum effective depth. Through such a neutral, reduced tree data structure, policies may be more easily expressed and evaluated in multiple cloud resources.

Figure 1:
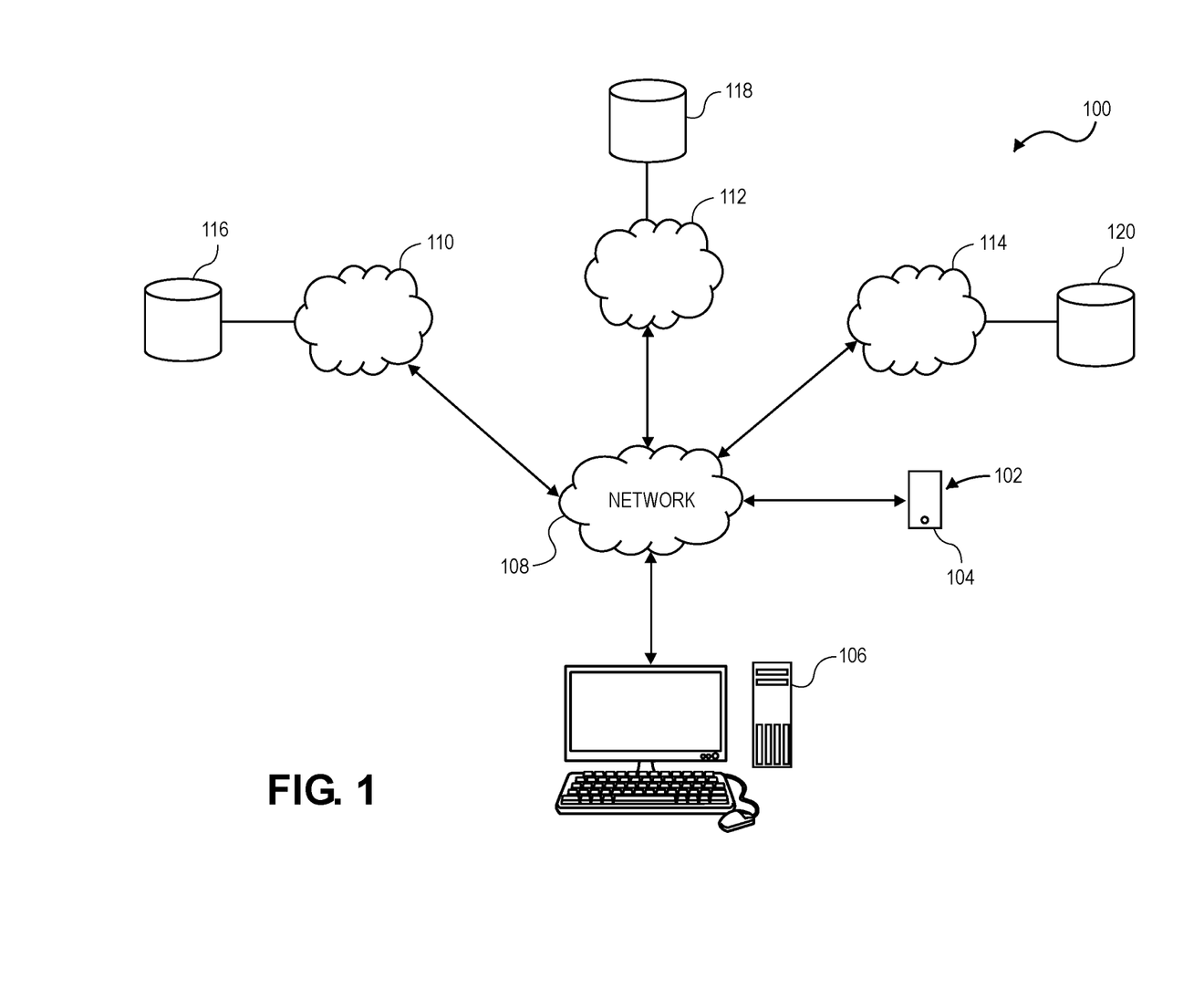
FIG. 1 is an exemplary system diagram of a client device paired with a plurality of online cloud resources and a server providing authorization services.

Turning now to the figures, FIG. 1 illustrates an exemplary system of embodiments of the present teachings referenced generally by reference numeral 100. In some embodiments, system 100 may comprise authorization services 102. As described in greater detail below, authorization services 102 may be an application or application programming interface (API) for defining, modifying, evaluating, or otherwise interacting with policies for one or more services, resources, or platforms. Further, authorization services 102 may be part of a larger system for evaluating policies against attribute values and conditions in accordance with the combination rules of the policy. Authorization services 102 may be run on a server 104 or other hardware configured for running authorization services 102. For example, authorization services 102 may run on a dedicated server, a shared server, a virtual machine instance in a cloud computing environment, or any other form of computing device. Although a single server is depicted, embodiments with multiple servers are also contemplated so as to provide scale, redundancy and/or isolation between different instances of authorization services 102. For example, a software development company may not wish to have its authorization services 102 hosted on the same server as a competitor's system for security reasons.

In some embodiments, authorization services 102 may be communicatively coupled to a client device 106 through a communication via network 108. Client device 106, by way of non-limiting example, may be a desktop computer, laptop computer, smart phone, or a tablet, or any other computing device that is capable of connecting to network 108. Network 108 may be a cloud-based network, or any other wireless networking configured for connecting hardware to cloud resources. For example, network 108 may be a local area network (LAN), wide-area network (WAN), virtual private network (VPN) or the Internet. Broadly speaking, any type of network for providing communication between the various components of system 100 is contemplated. However, it will be appreciated that other techniques for enabling communication among various types of client devices and authorization services 102 are also contemplated.

As further illustrated in FIG. 1, client device 106 and authorization services 102 through server 104 may further connect with one or more resources, services, or platforms, including for example, cloud resources 110, 112, and 114 respectively. Cloud resources, as used herein, may refer to on-demand infrastructure, platforms, or other software formats that are hosted and made available to end-users through an indirect connection, such as the Internet. More specifically, cloud resources, as used herein, may refer to virtual machines, servers, databases, or other types of online cloud resources. Some examples of commonly available and used cloud resource providers include, but are not limited to: Microsoft Azure, Google Cloud Platform, Amazon Web Services (AWS), Alibaba cloud, and SAP Business Technology Platform (BTP). It will be appreciated that these exemplary examples of cloud resources are not intended to be a limiting feature of the present teachings, and instead, is intended to be illustrative.

Furthermore, each of cloud resources 110, 112, and 114 may be connected to a cloud resource server, including for example cloud resource servers 116, 118, and 120 respectively. Cloud resource servers 116, 118, and 120 may be a physical or virtual infrastructure for storing and processing the cloud resources and for making cloud resources available to end-users. Additionally, cloud resource servers 116, 118, and 120 may store the underlying data structure of each of cloud resources 110, 112, and 114, including for example, the policies associated with each of cloud resources 110, 112, and 114. For example, the policies associated with each of cloud resources 110, 112, and 114 may provide for the requirements of accessing the cloud resource, for authenticating a use case, or other known uses of policies. In some embodiments, policies for each of cloud resources 110, 112, and 114 may written and formatted in a manner that is tailored for running the policies natively on the cloud resource server associated with the specific cloud resource. For example, the policies of cloud resource 110 may not be able to be distributed and used in cloud resource 112 unless the authorization systems and/or policies are translated into the language or format of cloud resource 112. Furthermore, this process of translation must be repeated if the policy of cloud resource 110 is to be distributed and used in other cloud resources, such as cloud resource 114. As described in greater detail below, authorization services 102 may be transformed into a neutral format and language model into which authorization policies may be converted, providing for more streamlined and consistent translations across multiple platforms or resources.

Figure 2:
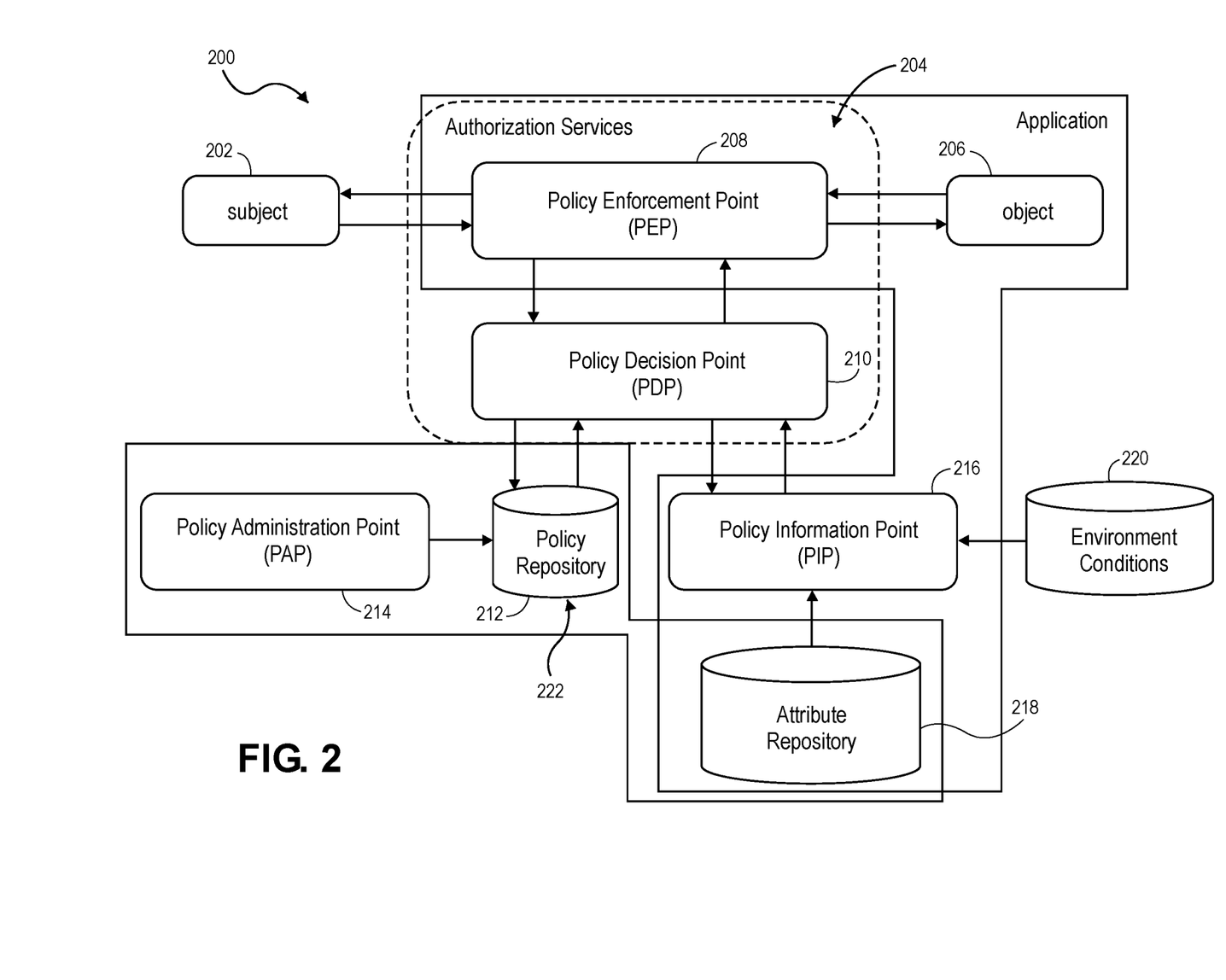
FIG. 2 is an exemplary system architecture of a distributed authorization system accordance with some embodiments.

Turning now to FIG. 2, an exemplary system architecture of a distributed authorization system accordance with some embodiments is depicted and referred to generally by reference numeral 200. In some embodiments, system 200 may receive attribute values and search for a policy having matching conditions, and upon locating a policy evaluate the policy against the conditions. Particularly, system 200 may comprise the received attribute values expressed or translated into a policy tree data structure in a neutral format, a repository of policies which are stored as computer-readable media in a neutral format. Some embodiment may have multiple values of the same attribute and therefore defines a scope or a range of this attribute. As depicted in FIG. 2, in some embodiments, a subject 202 may call out to, connect, or otherwise interact with authorization services 204 in an attempt to access a resource 206 or data stored or otherwise associated with resource 206. As used with reference to FIG. 2, subject 202 may be a customer, administrator, web engineer, or other end-user attempting to access resource 206. Furthermore, subject 202 may also comprise a client device, such as client device 106 as described above with respect to FIG. 1, that the end-user is using to connect and access resource 206. Additionally, as used herein, authorization services 204 may be the same authorization services 102 as described above with respect to FIG. 1. Even further, resource 206 may be the same as cloud resources 110, 112, or 114 as described above with respect to FIG. 1. By way of non-limiting example, subject 202 may be an end-user on a client device, attempting to access salary information stored or available on resource 206. Continuing with this example, the end-user through the client device may call out to a cloud resource, through a request comprising attribute values or expressions. Prior to granting access to resource 206, which may be the payroll information, authorization services 204 may review the attribute values of the request against one or more policies and make a determination as to whether the request should be granted or denied.

In some embodiments, authorization services 204 may comprise a policy enforcement point component (PEP) 208 and a policy decision point component (PDP) 210. PEP 208 and PDP 210 may be in communicative connection with one another, and furthermore, may be a part of the same API of authorization services 204. In some embodiments, the request to access resource 206 may include one or more expressions (or attribute values) associated with the request and/or subject 202. The attribute values may correspond to certain attributes of subject 202, such as login region, and/or identifying information about the subject, may comprise the action sought from the request, and/or the data sought from resource 206. Continuing with the example described above, attribute values may correspond to a user named "Adam" providing the identifying information about the subject; the action may be that subject 202 is seeking to read certain data or information from resource 206; the region may be "useast-1"; and the data sought to be read is salary information. PEP 208 may be configured to receive the request and the included attribute values from subject 202 and upon receipt of the request, may express the attribute values into expressions and add an implied "AllOf" combination rule and organize them into a policy tree in the neutral format before submitting the policy tree as a query request to PDP 210. In some embodiments, PDP 210 may be configured as the determination component, and may make the determination if the request and attribute values satisfy the conditions of one or more policies. For example, PDP 210 may search through the policies, which are stored and organized in the policy tree neutral format in policy repository 212, against the query policy tree by comparing attribute values in both policy trees; select the leaf expressions containing attribute values, ranges and scopes common in both policy trees; and select, from the root of the stored policy tree, the branch containing all the selected leaves; further search through the PIP 216, which organize additional attribute values, scopes, ranges or conditions and combination rules in the policy tree neutral format, for attribute values to narrow the values, scopes, ranges or conditions of the leaf expressions of the selected policy tree further; reduce the selected and narrowed policy tree to a neutral format; and respond to the query request from PEP 208 with the selected and narrowed policy tree in neutral format. If the response received from PDP 210 is an empty policy tree, PEP 208 denies the request from subject 202. If the response received from 210 encompasses the attribute values in the request, PEP 208 grant the request from subject 202.

In some embodiments, and to make the determination, PDP 210 may be in further communicative connection with a policy repository 212. Policy repository 212 may be a server or other database for storing one or more authorization policies that may be called out to by PDP 210. For example, policy repository 212 may be a private server configured for storing policies associated with one or more cloud resources comprising resource 206. In some embodiments, and as described in greater detail below, the policies stored in policy repository may comprise at least one combination rule and at least one expression. The expression of the policies may define the scope, range, value or condition of a particular attribute.

Furthermore, policy repository 212 may also be in communication and connection with policy administration point (PAP) 214. PAP 214 may be configured as a user interface for administrators, software engineers, or other users for creating, managing, testing, debugging, or otherwise manipulating and interacting with the policies stored in the policy repository. For example, PAP 214 may run on any of the devices as described herein, which is communicatively coupled to policy repository 212. Through PAP 214 a user, such as an administrator or senior software engineer, may access and interact with one or more policies stored in policy repository 212. For example, through PAP 214 an application developer, administrator, senior software engineer, or software may create or modify one or more policies stored in policy repository, by adding or removing combination rules, conditions, or any combination thereof.

In some embodiments, the policies stored in policy repository 212 and accessible through PAP 214 may be manipulated and translated into a neutral format, including for example a format neutral policy tree. For example, with access to the one or more policies stored in policy repository 212, a software agent may then devise or create a neutral format policy tree that one or more of the policies stored in policy repository 212 may be translated, converted, or otherwise transformed into. Such neutral format model may provide for more consistent and error-free translations when expressing a policy in multiple platforms. Furthermore, such neutral format model may also aid when PDP 210 is searching for policies stored in policy repository 212. For example, policy repository 212 may comprise a plurality of policies associated with a plurality of online resources and platforms. Non-limiting examples of such resources and platforms include, but are not limited to AWS, Microsoft Azure, SAP Cloud Analytics, S/4Hana, GCP, among any other currently known or yet to be developed cloud resources or platforms. Through computer-executable instructions, the stored policies in policy repository 212, a format neutral policy tree may be created and stored in policy repository 212. In some embodiments, the format neutral policy tree may comprise a generic policy data structure, providing a structure that policies can convert to and back from. For example, and as described in greater detail below, the format neutral policy tree model 222 may be designed or formatted as a reduced tree data structure for efficient storage. Specifically, in some embodiments, format neutral policy tree model 222 may strip down or compress the format of the policies to branches or sub-trees comprising AND/OR i.e., AllOf/AnyOf combinations of satisfying the requirements of the policy.

In addition to calling out to policy repository 212, PDP 210 may further call out to and communicate with policy information point (PIP) 216, which may provide additional values for processing and evaluating the access request. The calling message may be organized in the format of neutral format policy tree. For example, PIP 216 may serve as an intermediate component for retrieving additional attributes, or other data required for policy evaluation to provide the information needed by PDP 210 to decide whether to grant or deny the access request. As illustrated, to gather information to process the access request, PIP 216 may be communicatively coupled to at least one attribute repository 218 and at least one environment conditions 220. Attribute repository 218 may be configured for storing identifying information directed to the user or entity responsible for submitting the access request to access subject 202. The information may be expressed in the format of expressions, and relation among the expressions may be expressed as combination rules so that the information may be stored in the format of neutral format policy tree for easy search. For example, continuing with the example as described above, attribute repository 218 may comprise a listing of customer subscriptions for an enterprise. Such listing may comprise certain roles, permissions, or credentials associated with the enterprise and users associated with the enterprise. For example, resource 206 may be a payroll service storing sensitive information related to employee salaries in which only pre-approved users may be able to access. Continuing with the example from above, attribute repository 218 may store the credentials of all approved users that may access certain restricted portions of the payroll software. Because of the sensitive nature of the information available on the payroll sensitive, only certain users such as HR managers may be granted access to the payroll data.

Additionally, environment conditions 220 may be configured for defining the context of the access request, which may be used as an additional identifier for security purposes. The context information may be stored in the format of neutral format policy tree for easy search. For example, environment conditions 220 may be used to define certain information about the subject 202 making the access request, including the type of client device, the time at which the access request is made, the geo-location of the client device making the request, among other information that is indicative of the access request. Such environment information from environment conditions 220 may be used by PDP 210 to aid in determining the authenticity of the access request. For example, if it is determined that the access request is received from an atypical location, (e.g., an employee of a company that works primarily in the United States has a geolocation of China may be determined to likely be suspect activity).

Upon selection of the one or more policies from policy repository, attribute information from attribute repository 218, and environmental information from environment conditions 220, the information from the different sources may then be transferred to PDP 210. Upon receipt of the information, which is best in the format of neutral format policy trees, PDP 210 may translate it to the neutral format policy trees if it is. With the information in the neutral format of policy trees, PDP 210 may evaluate efficiently the access request with the retrieved policy, attribute information, and/or environmental information to determine whether to either grant of deny the access request. After evaluating all information, the determination in the form of either any empty policy tree or a policy tree defining the permitted scope of the access may then be sent to PEP 208 for execution. For example, if the determination made at PDP 210 concludes that the access request complies with the parameters set forth in the relevant policy, PEP 208 may grant access to resource 206 or alternatively, deny access to resource 206. However, continuing with the example from above, the relevant policy may limit access to salary information to approved users that have an HR manager role. Accordingly, if the attribute values associated with subject 202 do not contain values corresponding to an HR manager role, then the conditions of the policy are not satisfied and the subject will not be granted access to resource 206, i.e., salary information.

Figure 3:
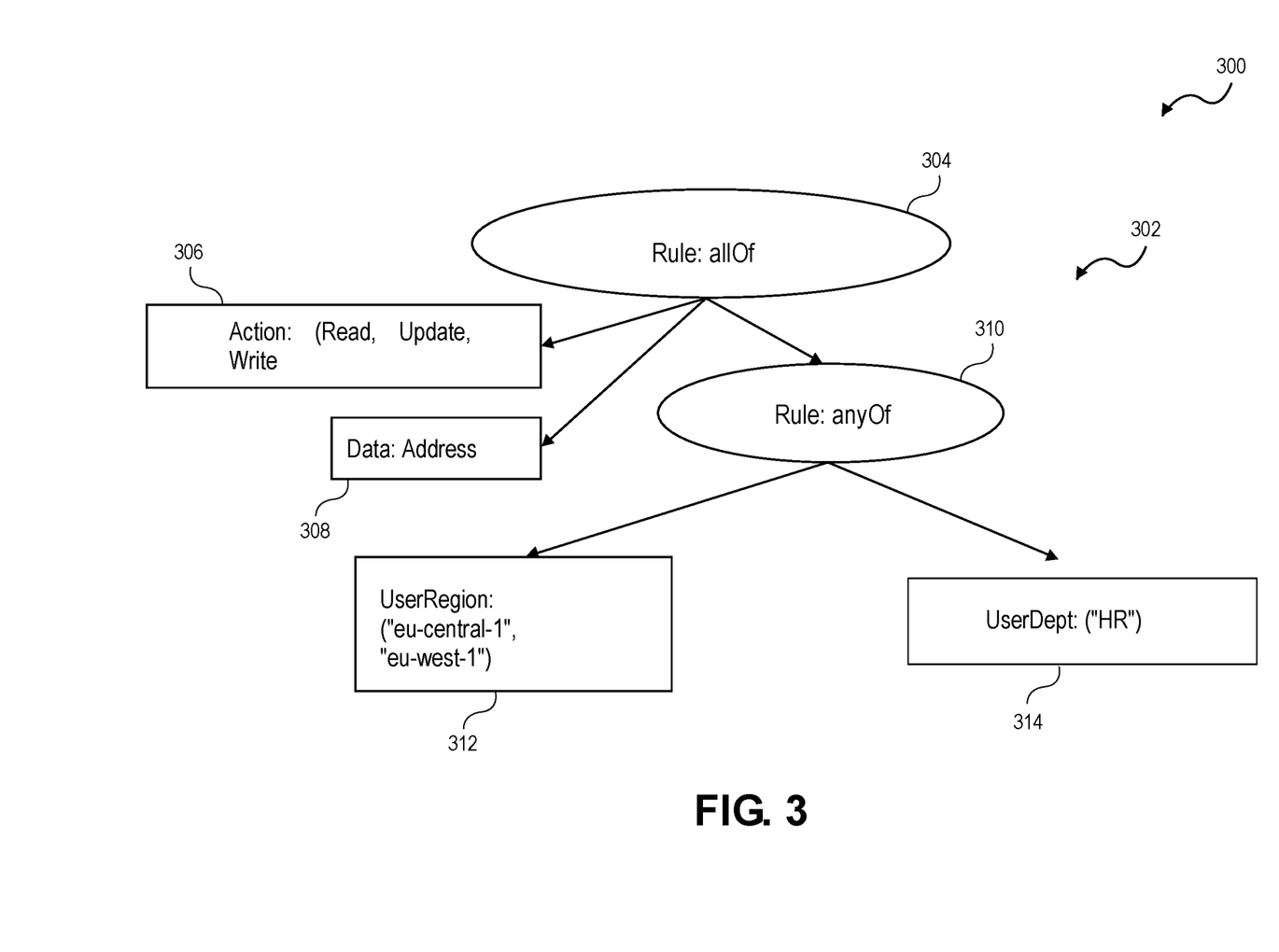
FIG. 3 is an exemplary reduced tree data structure in accordance with some embodiments.

Turning now to FIG. 3, an exemplary tree data structure comprising an exemplary embodiment of a format neutral policy tree model of the present teachings is depicted and referred to generally with reference numeral 300. In some embodiments and as depicted in the drawings, format neutral policy tree models as contemplated herein may be expressed as tree data structures, including for example tree data structure 302. As depicted, tree data structure 302 may comprise a plurality of branches, or nodes, having leaves of expressions defining the scopes, ranges, or conditions that attributes must be evaluated and satisfied prior to granting access to a cloud resource. The access that may be granted is often defined as the scope, range, or conditions of the access attributes. Depending on a number of factors, including the number of rules or expressions that must be satisfied, the number of branches of tree data structure 302 may vary. For example, the non-limiting example of tree data structure 302 as depicted comprises three branches, but it will be appreciated that tree data structure 302 may comprise any number of branches or sub-trees. Continuing with the depicted example, the nodes of tree data structure 302 may provide the combination rules or information of combining the requirements of the policy. For example, a first node 304 of tree data structure 302 may comprise a combination rule "allOf", requiring that all leaves must be satisfied. Furthermore, tree data structure 302 may comprise one or more leaves attached to a node through a branch, which may be a plurality of condition expressions, which define the scope, ranges, or conditions of attribute values. For example, tree data structure 302 may comprise leaf 306 and leaf 308 connected to node 304 through branches. In some embodiments, the leaves of each of the branches may be searched, compared, joined or evaluated against a received query policy tree comprising expressions and combination rules, and then be combined in accordance with the combination rules of the branch the leaves belong to. If evaluating an expression in 302 against a querying expression for the same attribute, the result is either an empty expression if the two expressions do not agree in the values, range, scope or condition of the attribute, otherwise, the expression contains the same information but is marked as satisfied. During policy tree reduction to the neutral format, a leaf with empty expression is removed if the node above it contains a combination rule "anyOf", or makes the node above it a leaf of empty expression if the node's combination rule is "allOf". During policy tree reduction to the neutral format, a leaf marked as satisfied is removed if the node above it contains a combination rule "allOf", or makes the node above it a leaf of empty expression if the node's combination rule is "anyOf". If joining an expression in 302 with a querying expression for the same attribute, the result is an expression defining the common values, range, scope or condition of the attribute. For example, in some embodiments a node may have a combination rule requiring that all condition expressions associated with the combination rule must be satisfied. Such combination rule may be noted or defined as an "AllOf" or an "And" rule. During policy tree reduction to the neutral format, a node with an "allOf" combination rule is reduced to an empty leaf if any of its leaf is empty; all its branches with leaves marked as satisfied are removed. In other embodiments, a branch may have a combination rule that only requires any condition expression associated with the combination rule must be satisfied. Such a combination rule may be noted or defined as an "AnyOf" or "Or" rule. During policy tree reduction to the neutral format, a node with an "anyOf" combination rule is reduced to a leaf of empty expression and is marked as satisfied if any of its leaf is marked satisfied; all its leaves with empty expression are removed. It will be appreciated that the combination rules may be alternative rules for validating conditions and are not limited to the combination rules described herein. During policy tree reduction to the neutral format, a branch node with a combination rule agreeing with that of its parent node and is combined with its parent node so that its leaves become the leaves of the parent node.

In some embodiments, tree data structure 302 may be reduced down through the removal of redundant combination rules or unsatisfied condition expressions. Specifically, any redundant or unnecessary rules and/or expressions may be stripped and removed from tree data structure 302, leaving only the essential combination rules and expressions required to maintain effectiveness of the policy. In other words, tree data structure 302 may be stripped or otherwise pared down to a minimum effective depth. For example, a policy may be formatted as having numerous nodes, leaves, and branches resulting in a tree data structure with numerous levels and sub-trees. Such a complex format results in unnecessary evaluation. For example, nodes of the tree data structure may contain combination rules that require evaluation of conditions that are unnecessary to reach a determination of whether the policy is satisfied or not. Through reduction, the tree data structure may be reduced in accordance with the methods described herein and strip or pare down the redundant rules. For example, in some embodiments, tree data structure 302 may comprise additional nodes, which may provide for sub-trees. For example, returning to FIG. 3, a third branch of tree data structure 302 may comprise a node 310, further comprising leaves 312 and 314. As described in greater detail below, in some embodiments, tree data structure 302 may be reduced through the removal of any redundant nodes, branches, leaves, or any combination thereof. For example, if a query policy tree comprising leaf expressions UserRegion: ["us-east-1"] and an implied combination rule "AllOf", during evaluation of the query policy tree against tree data structure 302 a determination may be made that leaf 312 is not satisfied. If such a determination is made, leaf 312 may be reduced, i.e., removed. Following the reduction, node 310 may then comprise only leaf 314. In some embodiments, tree data structure 302 may continue to be reduced through the removal of nodes having redundant combination rules. For example, with only leaf 314 following the removal of leaf 312, the "anyOf" combination rule of node 310 effectively can be interpreted as an "allOf" rule, because only one leaf remains. Accordingly, node 310 can be replaced by leaf 314, resulting in tree data structure comprising node 304 having three leaves 306, 308 and 314 respectively. Accordingly, through reduction, tree data structure 302 may be reduced down from three levels of depth to two levels of depth, and removing a redundant sub-tree.

Through reducing tree data structure to only the essential combination rules and condition expressions, policy trees may be searched, compared, translated, joined or evaluated in a more efficient manner. Furthermore, in some embodiments, tree data structure 302 may be reduced down to remove all redundant combinations, such that tree data structure 302 may not be reduced any further. Accordingly, reduced tree data structure 302 may be at the minimum depth to provide efficient storage and evaluation, while still retaining the purpose and functionality of a non-reduced policy.

Further, the format neutral policy tree model may provide many advantages and uses when evaluating or using policies modeled and stored in such a model. In some embodiments, the format neutral policy tree model may provide a neutral format for translating policies from one format to another. This may be particularly advantageous for expressing a policy from one platform on another platform. For example, a user may wish to use data located in a payroll software in an accounting software. Prior to using the data in the accounting software, a relevant policy may need to be translated from a first format associated with the payroll software to a second format of the accounting software. In a first step, the policy may be translated from the first format to the neutral format of the format neutral policy tree model. Upon translating to the tree data structure of the format neutral policy tree model, the policy may then be converted to a second format associated with the accounting software. By first translating policies to a neutral format, translations of policies from one platform to another may be made consistently and with greater confidence that policies may be expressed in different platform and use case.

In some embodiments, tree data structure 302 may also provide for more efficient storage of policies in policy storage repositories. For example, prior to reducing a policy, a policy may comprise a plurality of depths of levels of combination rules and conditions that add to the digital footprint of the policy. By reducing the depth, branches, and/or conditions of a policy, the digital footprint will likewise be reduced, requiring less storage space in a policy repository. The reduction of policy digital footprints may be particularly advantageous when multiple policies are stored in a policy repository, as the reduced format may increase the number of policies stored within a single policy repository. Further, in addition to decreasing the digital footprint of policies for storing in a policy repository, the reduced nature of the format neutral policy tree model may aid during the searching of policies within the policy repository. For example, by reducing the depth of the tree data structure, searching may be performed more efficiently and with less parameters that must be searched.

Figure 4:
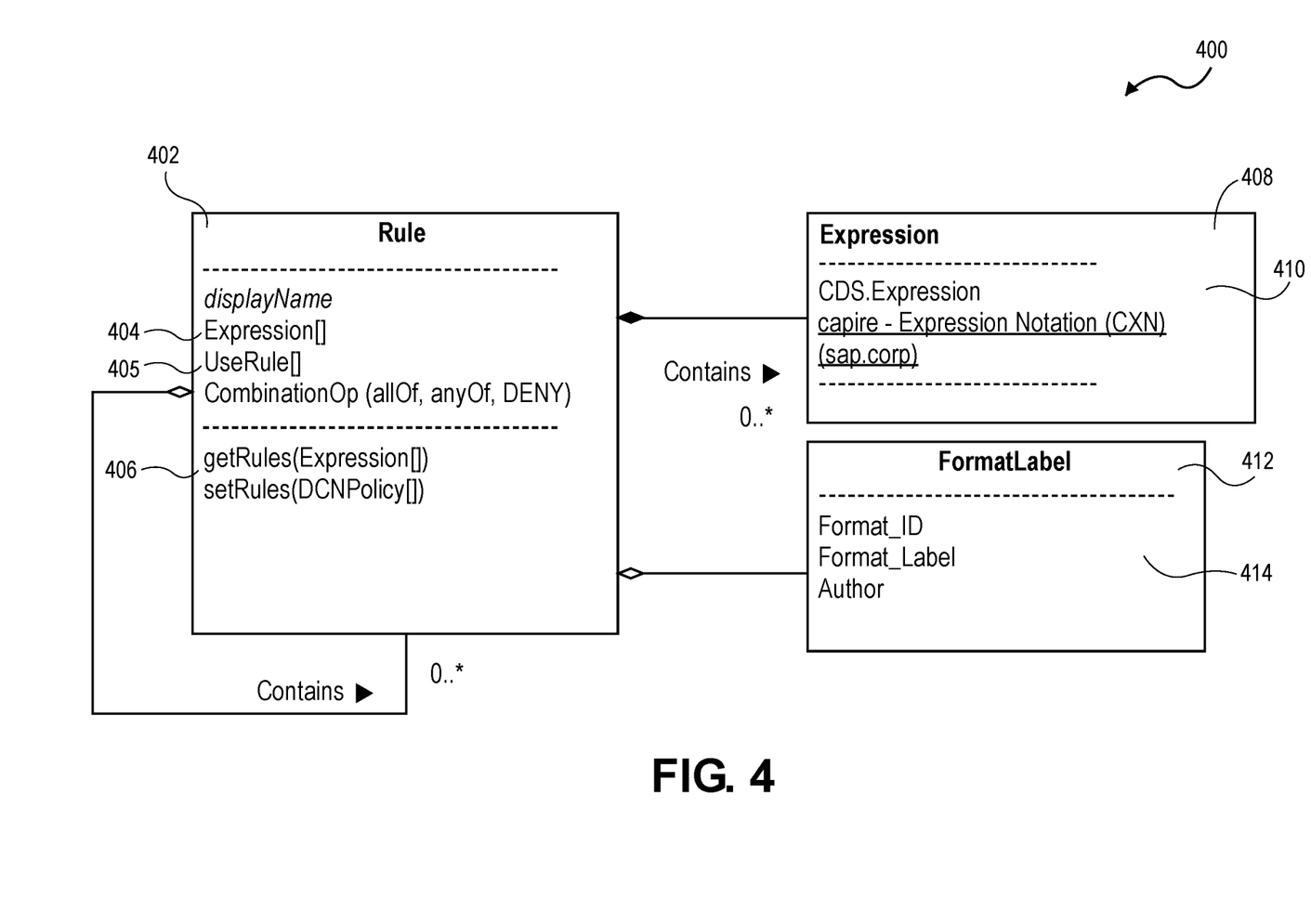
FIG. 4 is an exemplary object data model in accordance with some embodiments.

In some embodiments the branches and leaves of tree data structures may be expressed through object data models for use in object-oriented programs. For example, FIG. 4 depicts a practical object data model structure for an object-oriented program or database which is referred to with reference numeral 400. In some embodiments, a policy administration point, including for example PAP 214 may be written using an object-oriented language, such as Java, by way of non-limiting example. An administrator or other user may enter policy data, via a dashboard, user interface or other means that comprises a policy administration point, such as PAP 214 as described above, for constructing the format of data object model 400. For example, in some embodiments, the policy data may be created, modified, or otherwise interacted with using PAP 214. In some embodiments, the data object model 400 may comprise the rule class 402, storing the node data in the tree data structure. Object data model 400 may further comprise an expression array 404, which can contain the leaf expressions, if present. Object data model 400 may further comprise a UseRule array 405, which may contain the branch nodes. Functions 406 may be called to retrieve any sub-policy tree according to the query policy containing an input expression array.

Through such an object-oriented expression of the tree data structure, traversal to the branches or leaves of the tree data structure is efficient. In some embodiments, traversing toward the root of the tree data structure may require searching the UseRule array 405 against a known rule object or a known expression object. A rule object is the root of a policy tree if it is not contained in the UseRule[] array of any Rule object. For example, when searching through all policies, it may be more efficient if an implicit but not stored root node object is added that has a "anyOf" combination rule and a UseRule array containing all root Rule objects.

Figure 5:
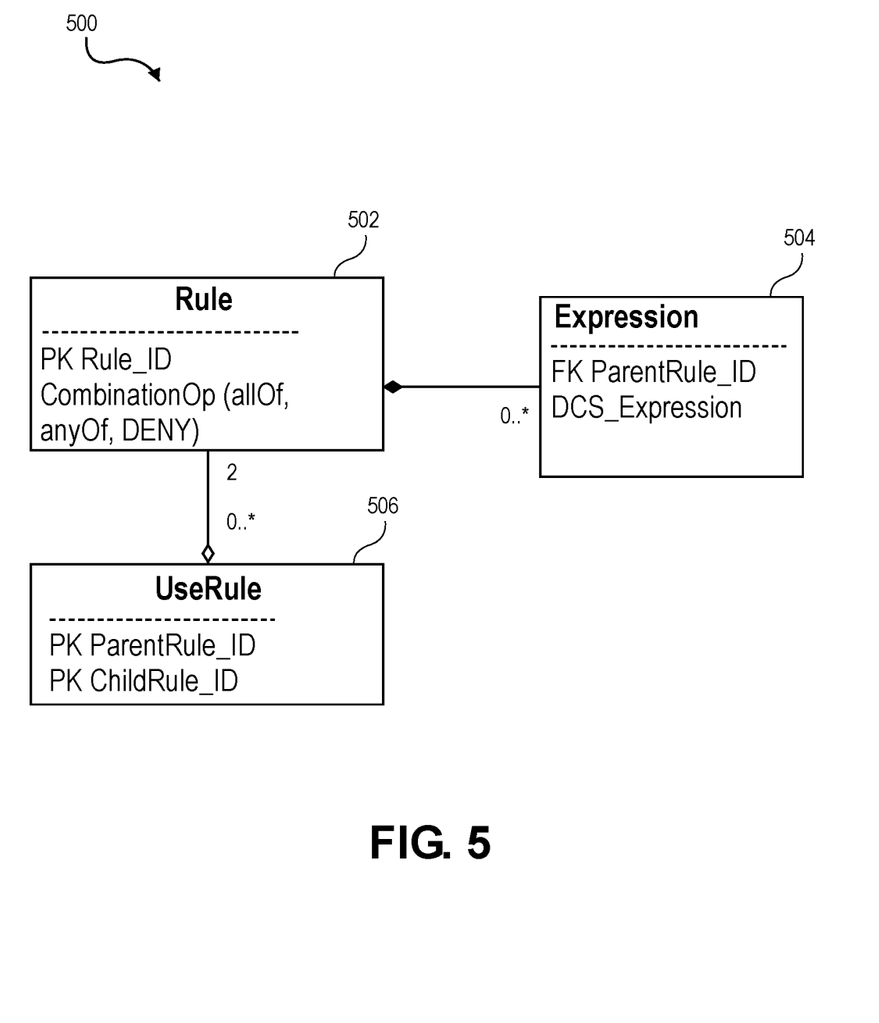
FIG. 5 is an exemplary entity data model in accordance with some embodiments.

Turning to FIG. 5, in some embodiments the branches and leaves of the tree data structure 302 may be defined through entity models for storage in relational databases. For example, a policy repository may use a relational database to store policy rules and expressions as shown in entity model 500. In some embodiments, table 502 (designated "Rule") contains a primary key of Rule_ID (integer) and one or more enumerated fields that may have the combination rule values of allOf, anyOf, or DENY. In some embodiments, other combination rules are possible. In these embodiments, table 504 (designated "Expression") may be related with table 502 by way of foreign key ParentRule_ID. In some such embodiments, table 504 has one or more fields including a field for storing a particular expression. In some embodiments DCS_Expression is a text field for storing an associated expression. Additionally, table 506 (designated "UseRule") has two primary keys for denoting parent and child (or branch) rule identifiers for constructing a tree. In the UseRule entity, the two fields, ParentRule_ID and ChildRule_ID, are both labelled with "PK" because they together form a composite primary key. Traversing the tree structure is efficient in both directions. With a known ParentRule_ID, its branch nodes can be identified by the values in the ChildRule_ID field. If a ChildRule_ID is known, its parent node can be identified by the value in the ParentRule_ID. A record with empty (or NULL) ChildRule_ID has only expressions as leaves. A record with empty (or NULL) ParentRule_ID is a root node of a policy. When searching through all policies, an implicit root node with "anyOf" combination rule may be added containing all the root nodes as children (or branches).

Figure 6:
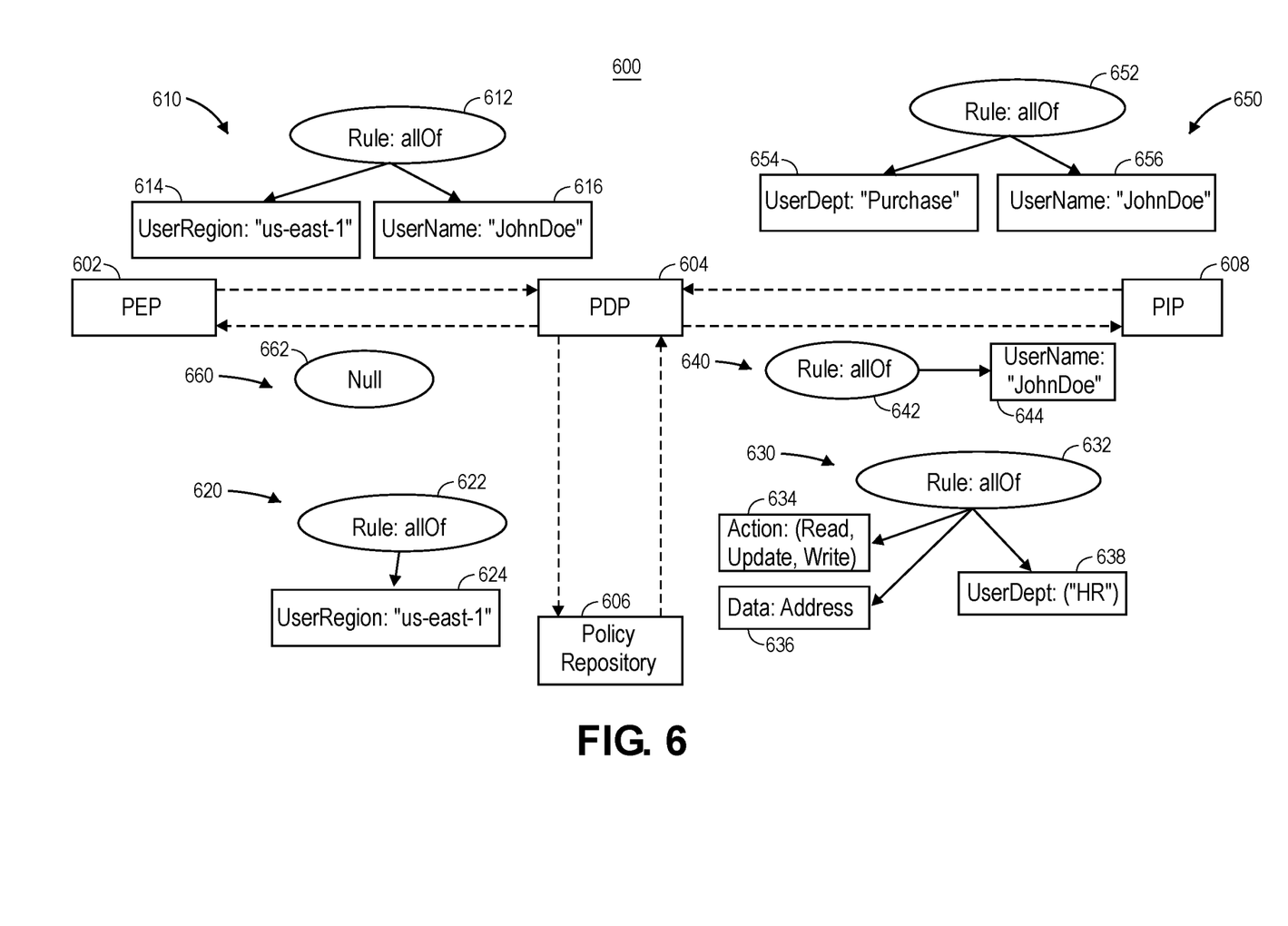
FIG. 6 is an exemplary diagram illustrating a method of evaluating a user request to access an application especially how the policy messages exchanged among the components in a distributed authorization system are expressed in the neutral format policy tree model in accordance with some embodiments.

Turning now to FIG. 6, an exemplary process of evaluating a user request is depicted and referred to generally with reference numeral 600. As illustrated, in some embodiments a user may attempt to access one or more features of an application through a user request which may be processed and evaluated by one or more policies. After logging in to the application, a user may submit a request to access features of the application, and the request may be received at a PEP 602. After receiving the request, the request may then be processed at PDP 604 which may be in communication with policy repository 606. Further, PDP 604 may be in communication with PIP 608 which may provide additional information or attributes used to evaluate the request. PEP 602, PDP 604, policy repository 606, and PIP 608 as reference by FIG. 6 may be the same PEP, PDP, policy repository and PIP as described above with respect to FIG. 2.

Upon a successful log-in, a user's information may be identified or otherwise known establishing what permissions the user has and what features or aspects of the application the user may access. The information associated with the user may be constructed or formulated as a tree data structure, in the neutral format as described above for efficient further processing or evaluation. For example, in some embodiments the user's information may be formulated as query policy 610. In some embodiments, query policy 610 may comprise at least one node and at least one leaf of user information. For example, query policy 610 may comprise node 612 and leaves 614 and 616. Node 612 may comprise the combination rule for the user information, including for example an "allOf" combination rule. In further embodiments, the combination rule for user information may not be explicitly sent from the PEP 602 to PDP 604 and instead may be an implied rule. Further, leaves 614 and 616 may comprise additional information associated with the requesting user, including the user region in leaf 614 and the user's username in leaf 616. In some embodiments, user information may be constructed or formulated further from other information repositories. For example, as depicted in FIG. 6 and in some embodiments, PDP 604 may identify user information, such as the username of the user as formulated in leaf 616 and call out to PIP 608 with one or more query policies to identify additional information about the requesting user and receive response of further user information in the policy tree neutral format.

After receiving the request and the user information, PDP 604 may call out to policy repository 606 by sending a query policy 620 formulated in the policy tree neutral format to locate policies having conditions that match the user information. For example, query policy 620 may have a node 622 comprising a combination rule of "allOf" and a leaf 624 having a condition expression for a user region. As described in greater detail above, the policies stored in policy repository 606 may be stored in a reduced neutral format, including for example reduced tree data structures. Upon identifying the policies stored in the policy repository that are associated with query policy 620, the located policies may be sent to PDP 604 for creating a determination. For example, response policy 630 may be identified as having matching conditions with query policy 620, with response policy 630 having a node 632 comprising a combination rule of "allOf" and leaves 634, 636, and 638 having condition expressions for "Action", "Data", and "UserDept" respectively.

Further, PDP 604 may call out to PIP 608 to locate one or more information associated with the requesting user, including for example the role or department associated with the requesting user. For example, PDP 604 may send a query 640 in the policy tree neutral format having a node 642 comprising a combination rule of "allOf" and a leaf 644 having a condition expression for "UserName." PIP 608 may then respond by sending response policy 650 in the policy tree neutral format, comprising a node 652 and leaves 654 and 656. Similar to query policy 620 as described above, node 652 may comprise an implicit "allOf" combination rule. Further, leaves 654 and 656 may comprise information associated with the requesting user's department and username, respectively.

During evaluation of the policy, PDP 604 can join policies having matching condition expressions reducing the tree data structures when redundant combination rules are identified and make a determination whether the policy is satisfied. For example, PDP 604 may join requesting user information of query policy 610, additional user information of response policy 650 with response policy 630. Because of conflicting leaves 654 and 638, during the joining and evaluation, PDP 604 may make a determination that the UserDept. of leaf 654 and the UserDept. of leaf 638 are not equals. For example, as depicted in FIG. 6, the requesting user is associated with a UserDept. of "Purchase" and the condition expression of leaf 638 is associated with a UserDept. of "HR". Accordingly, PDP 604 may join the leaves 638 and 654 as leaf of empty expression. Further, because the combination rule of node 632 requires "allOf," PDP 604 may further determine that response policy 630 is not satisfied because one of the leaves fails and reduce the policy tree to a node of empty expression. PDP 604 may then generate an overall determination of validation and respond to PEP 602 with 660 in the policy tree neutral format and a result 662 of an empty policy tree "Null." Accordingly, receiving no permission, PEP 602 may make an overall determination that the requesting user has no rights to access the requested portions or functions of the application.

Figure 7:
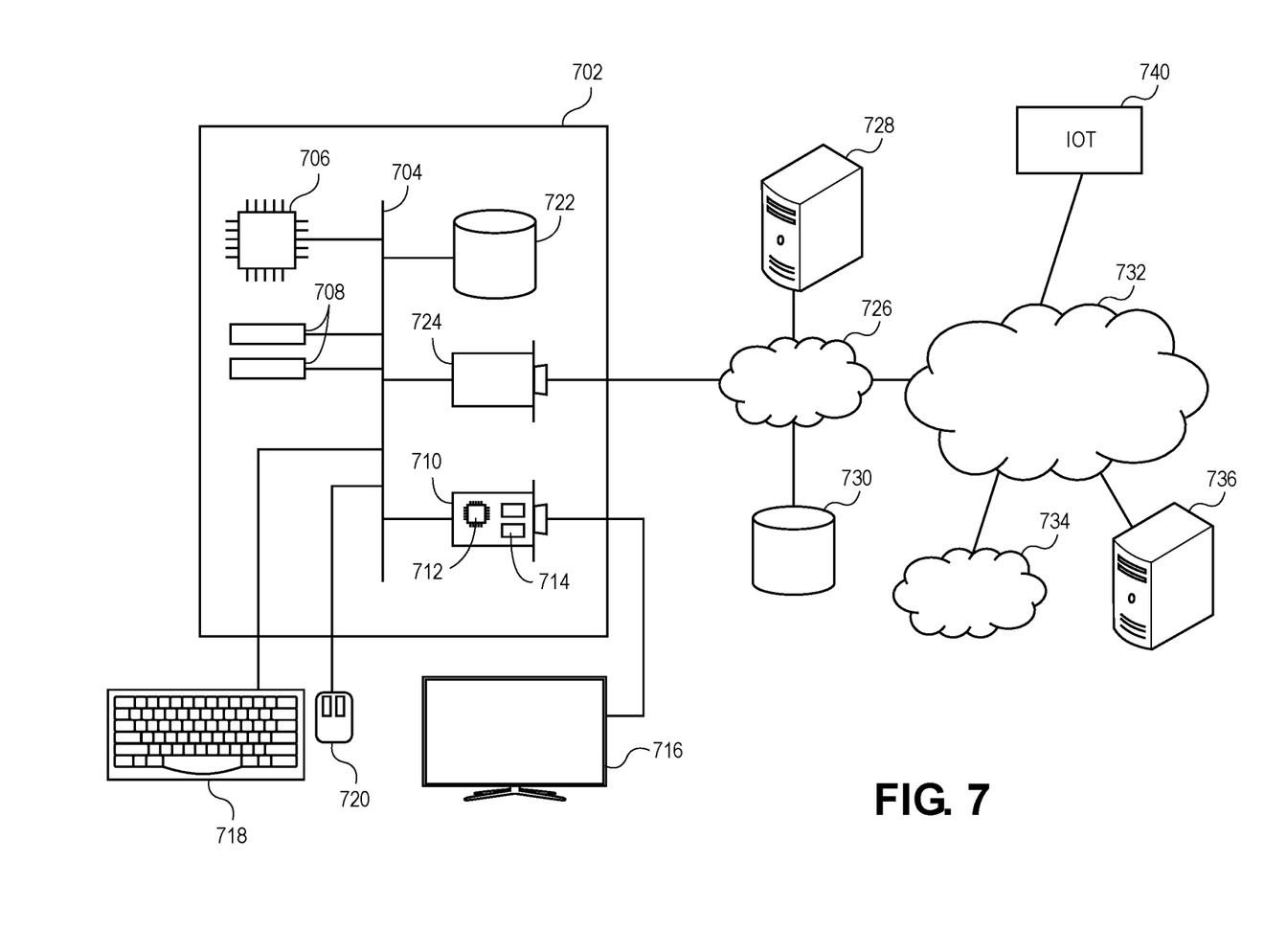
FIG. 7 is an exemplary hardware platform for certain embodiments.

FIG. 7 illustrates an exemplary hardware platform for certain embodiments of the present teachings. Computer 702 can be a desktop computer, a laptop computer, a server computer, a mobile device such as a smartphone or tablet, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses, or components may communicate with each other directly. Connected to system bus 704 is central processing unit (CPU) 706. Also attached to system bus 704 are one or more random-access memory (RAM) modules 708. Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments, no display is present, while in others it is integrated into computer 702. Similarly, peripherals such as keyboard 718 and mouse 720 are connected to system bus 704. Like display 716, these peripherals may be integrated into computer 702 or absent. In some embodiments, additional peripherals such as a microphone or video camera may also be present and connected to system bus 704. In some embodiments, such peripherals may be detachable connected to computer 702 via a wired or wireless connection. In other embodiments, such as a tablet or smartphone, these peripherals are integrated into computer 702. Also connected to system bus 704 is local storage 722, which may be any form of computer-readable media and may be internally installed in computer 702 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other non-transitory memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 724 is also attached to system bus 704 and allows computer 702 to communicate over a network such as network 726. NIC 724 can be any form of network interface known in the art, such as Ethernet, ATM, fiber, Bluetooth, or Wi-Fi (i.e., the IEEE 802.11 family of standards). NIC 724 connects computer 702 to local network 726, which may also include one or more other computers, such as computer 728, and network storage, such as data store 730. Generally, a data store such as data store 730 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 728, accessible on a local network such as local network 726, or remotely accessible over Internet 732. Local network 726 is in turn connected to Internet 732, which connects many networks such as local network 726, remote network 734 or directly attached computers such as computer 736. In some embodiments, computer 702 can itself be directly connected to Internet 732, such as for example, the Internet of Things (IoT) 740.

Although the disclosure has been described with reference to the embodiments illustrated in the attached drawing figures, it is noted that equivalents may be employed, and substitutions made herein without departing from the scope of the disclosure as recited in the claims.

Having thus described various embodiments of the disclosure, what is claimed as new and desired to be protected by Letters Patent includes the following:

1. One or more non-transitory computer-readable media storing computer-executable instructions that, when executed by a processor, perform a method for processing software authorization policies in order to translate the software authorization policies from a first format to a second format via a neutral format, the method comprising:

receiving a user request for an authorization access comprising a first policy tree, said first policy tree comprising at least one first condition expression and at least one first combination rule;
responsive to receiving the first policy tree, searching a second policy tree stored in a policy repository to select a sub-policy tree, said second policy tree comprising at least one second condition expression and at least one second combination rule,
wherein policies of the first policy tree and the second policy tree are organized in the neutral format, wherein the neutral format is a reduced tree data structure comprising at least one node having at least one first or second combination rule and at least one leaf having at least one first or second condition expression,
wherein a depth of the reduced tree data structure is reduced through a removal of any redundant combination rules and combination of evaluated leaf condition expressions;
selecting the sub-policy tree from the stored second policy tree based upon comparing against the first policy tree;
copying the selected sub-policy tree to a third policy tree, said third policy tree comprising at least one third condition expression and at least one third combination rule,
wherein said at least one first condition expression, said at least one second condition expression, and said at least one third condition expression defines a scope, a range, or a condition of an attribute value, and
wherein said at least one first combination rule, said at least one second combination rule, and said at least one third combination rule comprises: "AllOf", "And", "AnyOf" or "Or";
evaluating at least one leaf of the third policy tree against the at least one leaf of the first policy tree;
joining the at least one node having the at least one third combination rule of the third policy tree against the at least one node having the at least one first combination rule of the first policy tree;
reducing the third policy tree to the neutral format by combining the at least one evaluated leaf and removing redundant combination rules; and
responding to the user request with the third policy tree, wherein said response indicates the authorization access associated with the user request.

2. The one or more non-transitory computer-readable media of claim 1, wherein the reduced tree data structure comprises a first node having a first plurality of leaves and a second node having a second plurality of leaves.

3. The one or more non-transitory computer-readable media of claim 2, wherein the first node comprises the first combination rule and the first plurality of leaves comprise a first plurality of first condition expressions for satisfying the first combination rule.

4. The one or more non-transitory computer-readable media of claim 3, wherein the first combination rule requires all condition expressions of the first plurality of condition expressions must be met.

5. The one or more non-transitory computer-readable media of claim 4, wherein the second node comprises the second combination rule and the second plurality of leaves comprise a second plurality of second condition expressions for satisfying the second combination rule.

6. The one or more non-transitory computer-readable media of claim 5, wherein the second combination rule requires that only one condition expression of the second plurality of second condition expressions must be met.

7. The one or more non-transitory computer-readable media of claim 6, wherein the reduced tree data structure comprises a third node having a third plurality of leaves.

8. A method for processing software authorization policies in order to translate the software authorization policies from a first format to a second format via a neutral format, the method comprising:
receiving a user request for an authorization access comprising a first policy tree, said first policy tree comprising at least one first condition expression and at least one first combination rule;
responsive to receiving the first policy tree, searching a second policy tree stored in a policy repository to select a sub-policy tree, said second policy tree comprising at least one second condition expression and at least one second combination rule,
wherein policies of the first policy tree and the second policy tree are organized in the neutral format, wherein the neutral format is a reduced tree data structure comprising at least one node having at least one first or second combination rule and at least one leaf having at least one first or second condition expression,
wherein a depth of the reduced tree data structure is reduced through a removal of any redundant combination rules and combination of evaluated leaf condition expressions;
selecting the sub-policy tree from the stored second policy tree based upon comparing against the first policy tree;
copying the selected sub-policy tree to a third policy tree, said third policy tree comprising at least one third condition expression and at least one third combination rule,
wherein said at least one first condition expression, said at least one second condition expression, and said at least one third condition expression defines a scope, a range, or a condition of an attribute value, and
wherein said at least one first combination rule, said at least one second combination rule, and said at least one third combination rule comprises: "AllOf", "And", "AnyOf" or "Or";
evaluating at least one leaf of the third policy tree against the at least one leaf of the first policy tree;
joining the at least one node having the at least one third combination rule of the third policy tree against the at least one node having the at least one first combination rule of the first policy tree;
reducing the third policy tree to the neutral format by combining the at least one evaluated leaf and removing redundant combination rules; and
responding to the user request with the third policy tree, wherein said response indicates the authorization access associated with the user request.

9. The method of claim 8, further comprising:
before evaluating the third policy tree, receiving a request to translate the selected sub-policy tree from the neutral format to the second format.

10. The method of claim 9, further comprising:
responsive to the request to translate, translating the third policy tree from the neutral format to the second format.

11. The method of claim 10, further comprising:
responsive to the translating, performing the evaluating while the third policy tree is in the second format.

12. The method of claim 11, further comprising:
translating the third policy tree from the second format back to the neutral format.

13. The method of claim 8, wherein the reduced tree data structure comprises a first node having a first plurality of leaves and a second node having a second plurality of leaves.

14. The method of claim 13, wherein:
the first node comprises the first combination rule and the first plurality of leaves comprise a first plurality of first condition expressions for satisfying the first combination rule, and
the second node comprises the second combination rule and the second plurality of leaves comprise a second plurality of second condition expressions for satisfying the second combination rule.

15. A system comprising at least one processor and at least one non-transitory memory storing computer executable instruction that when executed by the at least one processor cause the system to carry out actions for processing a software authorization policy in order to translate the software authorization policy from a first format to a second format via a neutral format comprising:
receiving a user request for an authorization access comprising a first policy tree, the first policy tree comprising at least one first condition expression and at least one first combination rule;
responsive to receiving the first policy tree, searching a second policy tree stored in a policy repository to select a sub-policy tree, said second policy tree comprising at least one second condition expression and at least one second combination rule,
wherein policies of the first policy tree and the second policy tree are organized in the neutral format, wherein the neutral format is a reduced tree data structure comprising at least one node having at least one first or second combination rule and at least one leaf having at least one first or second condition expression,
wherein a depth of the reduced tree data structure is reduced through a removal of any redundant combination rules and combination of evaluated leaf condition expressions;
selecting the sub-policy tree from the stored second policy tree based upon comparing against the first policy tree;
copying the selected sub-policy tree to a third policy tree, said third policy tree comprising at least one third condition expression and at least one third combination rule,
wherein said at least one first condition expression, said at least one second condition expression, and said at least one third condition expression defines a scope, a range, or a condition of an attribute value, and
wherein said at least one first combination rule, said at least one second combination rule, and said at least one third combination rule comprises: "AllOf", "And", "AnyOf" or "Or";
evaluating at least one leaf of the third policy tree against the at least one leaf of the first policy tree;
joining the at least one node having the at least one third combination rule of the third policy tree against the at least one node having the at least one first combination rule of the first policy tree;
reducing the third policy tree to the neutral format by combining the at least one evaluated leaf and removing redundant combination rules; and
responding to the user request with the third policy tree, wherein said response indicates the authorization access associated with the user request.

16. The system of claim 15, further comprising the policy repository storing a plurality of policies.

17. The system of claim 16, the system further comprising:
an interface communicatively coupled to the policy repository.

18. The system of claim 17, wherein the reduced tree data structure may be interacted with via the interface.

19. The system of claim 15, wherein the reduced tree data structure comprises a first node having a first plurality of leaves and a second node having a second plurality of leaves.

20. The system of claim 19, wherein:
the first node comprises the first combination rule and the first plurality of leaves comprise a first plurality of first condition expressions for satisfying the first combination rule, and
the second node comprises the second combination rule and the second plurality of leaves comprise a second plurality of second condition expressions for satisfying the second combination rule.

* * * * *